United States Patent

Nottingham et al.

(10) Patent No.: US 8,296,381 B2
(45) Date of Patent: Oct. 23, 2012

(54) METHOD AND COMPUTER PROGRAM PRODUCT FOR RECEIVING AN UPDATE TO A PREVIOUSLY RECEIVED EMAIL MESSAGE

(75) Inventors: Alasdair Nottingham, Southampton (GB); Kevin Brian Smith, Eastleigh (GB); Timothy James Ward, Southampton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/778,164

(22) Filed: May 12, 2010

(65) Prior Publication Data

US 2010/0293238 A1   Nov. 18, 2010

(30) Foreign Application Priority Data

May 12, 2009   (GB) ................... 09159986.0

(51) Int. Cl.
   *G06F 15/16* (2006.01)
   *H04L 9/30* (2006.01)
(52) U.S. Cl. ........................ 709/206; 713/170
(58) Field of Classification Search .......... 709/206, 709/246; 380/255; 713/170
   See application file for complete search history.

(56) References Cited

U.S. PATENT DOCUMENTS

| | | | |
|---|---|---|---|
| 5,870,548 A * | 2/1999 | Nielsen | 709/206 |
| 6,192,396 B1 | 2/2001 | Kohler | |
| 6,230,186 B1 * | 5/2001 | Yaker | 709/206 |
| 6,597,771 B1 | 7/2003 | Svoboda | |
| 6,775,689 B1 | 8/2004 | Raghunandan | |
| 7,032,030 B1 * | 4/2006 | Codignotto | 709/246 |
| 7,065,554 B1 * | 6/2006 | Kiyohara | 709/206 |
| 7,624,146 B1 * | 11/2009 | Brogne et al. | 709/206 |
| 7,730,142 B2 * | 6/2010 | LeVasseur et al. | 709/206 |
| 2003/0037114 A1 * | 2/2003 | Nishio et al. | 709/206 |
| 2004/0254989 A1 * | 12/2004 | Baratakke et al. | 709/206 |
| 2005/0108351 A1 | 5/2005 | Naick | |
| 2006/0031302 A1 * | 2/2006 | Nuortila | 709/206 |
| 2006/0277260 A1 | 12/2006 | Hardy | |
| 2007/0016647 A1 * | 1/2007 | Gupta et al. | 709/206 |
| 2007/0106736 A1 | 5/2007 | Shepherd | |
| 2008/0010348 A1 * | 1/2008 | Dawson et al. | 709/206 |

(Continued)

FOREIGN PATENT DOCUMENTS

EP   1087321 A1   3/2001

OTHER PUBLICATIONS

IBMTDB1—"Multi part E-mailer", IP.COM No. IPCOM000015434D, (Nov. 12, 2009).

(Continued)

*Primary Examiner* — Jungwon Chang
(74) *Attorney, Agent, or Firm* — David Mims; Mark P Kahler (57) ABSTRACT

A method and computer program product enable an email user to receive an update to a previously received email message. An email client receives an update to the previously received email message is received. Privacy information in the update is identified and that privacy information is associated with a first portion of the previously received email message. The privacy information indicates whether the user is permitted to view that first portion of the previously received email message. The privacy information may be used to update the previously received message.

20 Claims, 8 Drawing Sheets

U.S. PATENT DOCUMENTS

2009/0182824 A1* 7/2009 Haynes et al. ............... 709/206
2009/0214034 A1* 8/2009 Mehrotra et al. ............ 380/255

OTHER PUBLICATIONS

IBMTDB2—"Privacy Notes in Email Documents", IP.COM No. IPCOM000134776D, (Mar. 20, 2006).
IBMTDB3—"Lotus Notes—Internal Email Use Only Functionality", IP.COM No. IPCOM000138239D (Jul. 11, 2006).
Lotus Notes—"Lotus Notes 6 Help—Working Online or Offline", downloaded from http://www-12.lotus.com on Apr. 21, 2010.
Microsoft_Outlook—"Microsoft Office Online—How Message Recall Works", downloaded from http://office.microsoft.com/en-us/outlook/HA010917601033.aspx on Apr. 21, 2010.
Securus—"Safe Message Secure Communications", (2008).
Thomas—"Your All-Important Email Privacy Self-Destructing Emails and Encryption", downloaded from www.pimall.com on Jul. 17, 2009.

* cited by examiner

METHOD AND COMPUTER PROGRAM PRODUCT FOR RECEIVING AN UPDATE TO A PREVIOUSLY RECEIVED EMAIL MESSAGE

BACKGROUND

The disclosures herein relate generally to email messages and more particularly to the processing of confidential email messages.

Email is frequently used to send confidential information, often to groups. Occasionally, such confidential information can be inadvertently sent to someone who is not authorized to see it or possess a copy of it. This can occur, for example, if the sender mistypes a recipient's email address or if someone fails to notice the full list of recipients when "replying to all". IBM's Lotus® Notes® includes an outgoing mail box from which mail can be deleted before it is sent. However, more control over who receives an email message is desirable.

BRIEF SUMMARY

In one embodiment, a communication method is disclosed wherein a user to receives an update to a previously received message. The method includes receiving an update to the previously received message. The method also includes identifying privacy information in the update that is associated with a first portion of the previously received message, the privacy information indicating whether the user is permitted to view that first portion of the message. The method further includes using the privacy information to update the previously received message. The previously received message may be replaced with an updated version of the previously received message or the previously received message itself may be modified. The privacy information may include a recipient name and the named recipient may be classified as either being able to, or being unable to, view the first portion of the message associated with the privacy information. The privacy information may include wildcard information. Pattern matching may be used to determine whether a recipient is permitted to view received data.

In another embodiment, responsive to determining that the user is not permitted to view that first portion of the message, that first portion of the message is redacted. This redaction may include removing the first portion entirely. The first portion may be replaced with identifying information. This means that if an authorized user subsequently receives the message, it may be possible to make the redacted portion visible again. The redacted information may be replaced with a digest of the message. In one embodiment, related message(s) are identified and the privacy information is used to update these related messages. In one embodiment, a message is sent to a recipient. The message may include the updated message. This may involve determining if the recipient of the sent message is authorized to view a second portion of the message. Responsive to a determination that the recipient is not authorized to view the second portion of the message, that second portion of the message may be redacted. The first and second portions of the message may in fact be the same.

In yet another embodiment, communication method is disclosed wherein a previously sent message is opened. A portion of the previously sent message is identified and privacy information is associated with the portion of the previously sent message. This privacy information indicates whether a previous recipient of the previously sent message is permitted to view the portion of the previously sent message. The previously sent message is resent to the previous recipient of the previously sent message. In one embodiment, at least one previous recipient is associated with the portion of the previously sent message. The privacy information may indicate that none of the previous recipients should be able to view the portion of the previously sent message. The resent message may include the payload of the previously sent message, marked up with privacy information indicating whether the previous recipient is permitted to view the portion of the previously sent message. The resent message may includes privacy information indicating whether a previous recipient of the previously sent message is permitted to view the portion of the previously sent message and wherein the resent message also includes an indication as to which portion of the previously sent message it refers to. In one embodiment, a new message is generated based on the privacy information, which indicates whether a previous recipient of the previously sent message is permitted to view the portion of the previously sent message, and based on the previous recipient to whom the message is to be resent. The generation of a new message may includes identifying to whom the message is to be resent. The generating of the new message may further include determining from the privacy information whether the identified recipient is permitted to view the portion of the previously sent message. The generating of the new message may also include redacting the portion of the previously sent message prior to resending the message, responsive to determining that the identified recipient should be unable to view the portion of the previously sent message. In one embodiment, the originator of a message may specify who is allowed to modify access permissions associated with message content.

In yet another embodiment, an apparatus is provided for a user to receive an update to a previously received message, the apparatus including a component for receiving an update to the previously received message. The apparatus also includes a component for identifying privacy information in the update that is associated with a first portion of the previously received message, the privacy information indicating whether the user is permitted to view that first portion of the message. The apparatus also includes a component for using the privacy information to update the previously received message.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

The disclosed communication methodology relates to an email client that allows a user to send an "update" to a previously sent email message. Instead of either forwarding or creating a new email, the method provides the user with an option to send an update to the original email message. The sent (newly updated) email message may include information relating to the original email message and the changes that have been made to the original email message, utilizing the existing Multipurpose Internet Mail Extensions (MIME) email message format.

The new update email message is preferably compatible with existing (legacy) email clients. However, on clients that implement the advanced features of the disclosed communication method, it is possible to identify if an update has been received and also to apply the changes to the original email message (or to generate an email message that is to replace the original email message). The sending email client provides the user with the ability to select a previously sent email message and indicate that they wish to make an update to that email message. The user of the sending email client may make changes as appropriate and then send the email message to a receiving email client or recipient.

The receiving email client includes an update feature such that, upon opening an email message, the receiving email client checks is to identify any updates that it received. These updates may be changes that the sender intended to include in the body of the original email message (e.g. text changes). In this case, the receiving email client informs the user that an updated email message is available and provides that user with the opportunity to open the updated version of the email message instead of the original email message. In one embodiment, the disclosed communication methodology is particularly concerned with updates concerning privacy information. Email messages may preferably be updated to indicate which parts of an email message are not intended to be viewed by a particular recipient. Email clients that do not understand the provided update simply accept the email message as though it were a new email message. It will be appreciated that the security risk is not negated in this instance since legacy clients and malicious clients may still hold onto a copy of the original email message. However, in this scenario, the situation is not made any worse than the existing case. In the case where it is possible to guarantee that the client will support updates (e.g. inside a company) there is an improvement in security.

Email messages systems typically employ MIME encoding. This allows multiple types of information to be sent in an email message, for instance an HTML marked-up version of the email message, followed by a plain text version of the email message for email readers that cannot handle the former. In the case of "alternate" encodings, the order of these formats is important, because an email client will typically work through the alternatives, starting at the last one in the email message and, if not supported on the client, working forward. The lowest common denominator (in most cases, this should be plain text simply for compatibility with the most basic clients) is preferably therefore placed first in the email message.

The disclosed methodology includes two possible ways in which the MIME encoding can be used to provide an update feature.

1: An extra MIME content section can be added to the end of the email message. This extra section identifies itself as an update type and contains information on the header of the original email message that was sent (the one to which the update applies). This header information enables identification of the original email message on the receiving client and may include, for example, an identifier, the subject, the date and time. The rest of the email message includes the full version of the updated email message (this is especially useful when a receiving client is a legacy system).

Depending on the facilities of the email client, one of the following occurs upon the email client receiving an update email message:

Update Compatible Client

An update-compatible email client recognizes the update encoding in the email message (the update compatible encoding in the email message would be the first examined because it is located as the last alternate in the MIME email message). The update-compatible client is able to process the header information included to identify the original email message. If the original email message is no longer available on the receiving email client because of being previously deleted, then the updated email message may simply be shown). In the situation where the updates are to the body content of the email message, having identified the original email message, the two email messages may be linked together to allow the email message client to inform the user about updates should the older email message be opened. The receiving email client may run a "diff" comparison between the original and the updated email message to identify the changes.

Legacy Client—Not Update compatible

Since the received email message contains "alternate" encodings, the encodings are examined by the email client starting with the last encoding in the email message and working forward. However, in the case of the legacy client, the legacy client does not support the update encoding, so the legacy client drops down to the next entry. Since this would be a just like any other email message that the client receives, the message would appear in the email inbox as a standard email message containing the full updated contents. No update features would be available in this scenario where a legacy client receives an email message including update information.

2: In addition to the extra MIME section added in option 1 above, the client sending the update could also add extra MIME sections containing the diff information, highlighting the changes from the original, using standard diff notation. By having the sender client send the diff information, the calculation of the changes would only have to occur once (on the sender's client) rather than with each recipient client.

A combination of 1 and 2 above is also possible and within the scope of the teachings herein.

While text and other updates to the content of an email message are discussed, the disclosed methodology is particularly concerned with content that is confidential and should not be viewed by some or all of the recipients to which an email message has been sent. As discussed above, the disclosed methodology provides a mechanism for updating a previously sent email message. In this way, particular content within the email message can be marked as confidential and the viewing of such material can be appropriately restricted.

Figure 1:
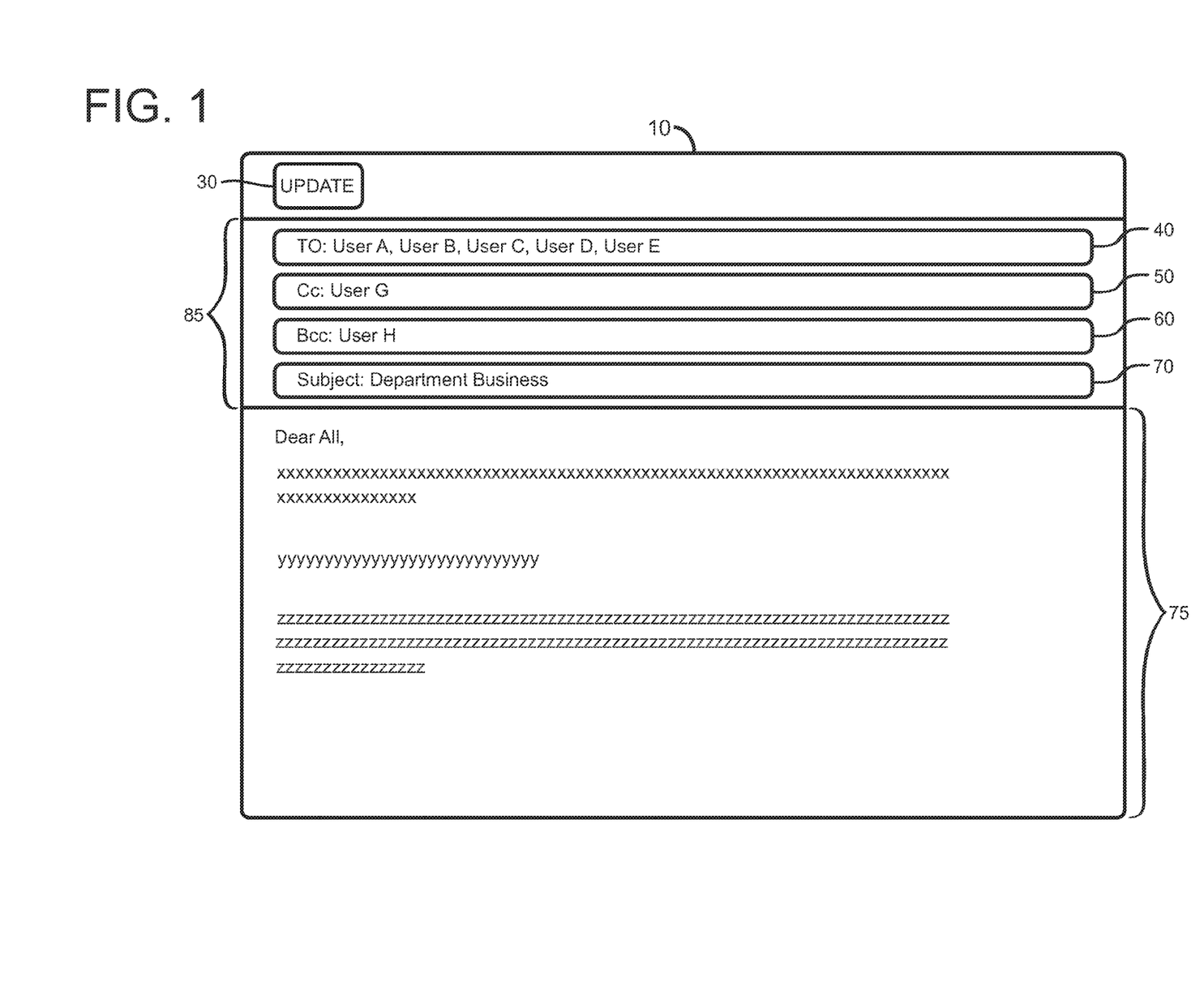
FIG. 1 shows a screen shot of the disclosed email client.

FIG. 1 shows a screen shot from a simplified email client. Display screen 10 displays a memo including a header section 85 and a body section 75. The header section 85 indicates that this memo was previously sent ("To" field 40) to 5 recipients (User A, User B, User C, User D and User E) and was copied ("Cc" field 50) to User G and was blind copied ("Bcc" field 60) to User H. The email client includes an update button 30 for updating the email message to include security (privacy) information. The body section 75 includes the text of the email message.

Figure 2:
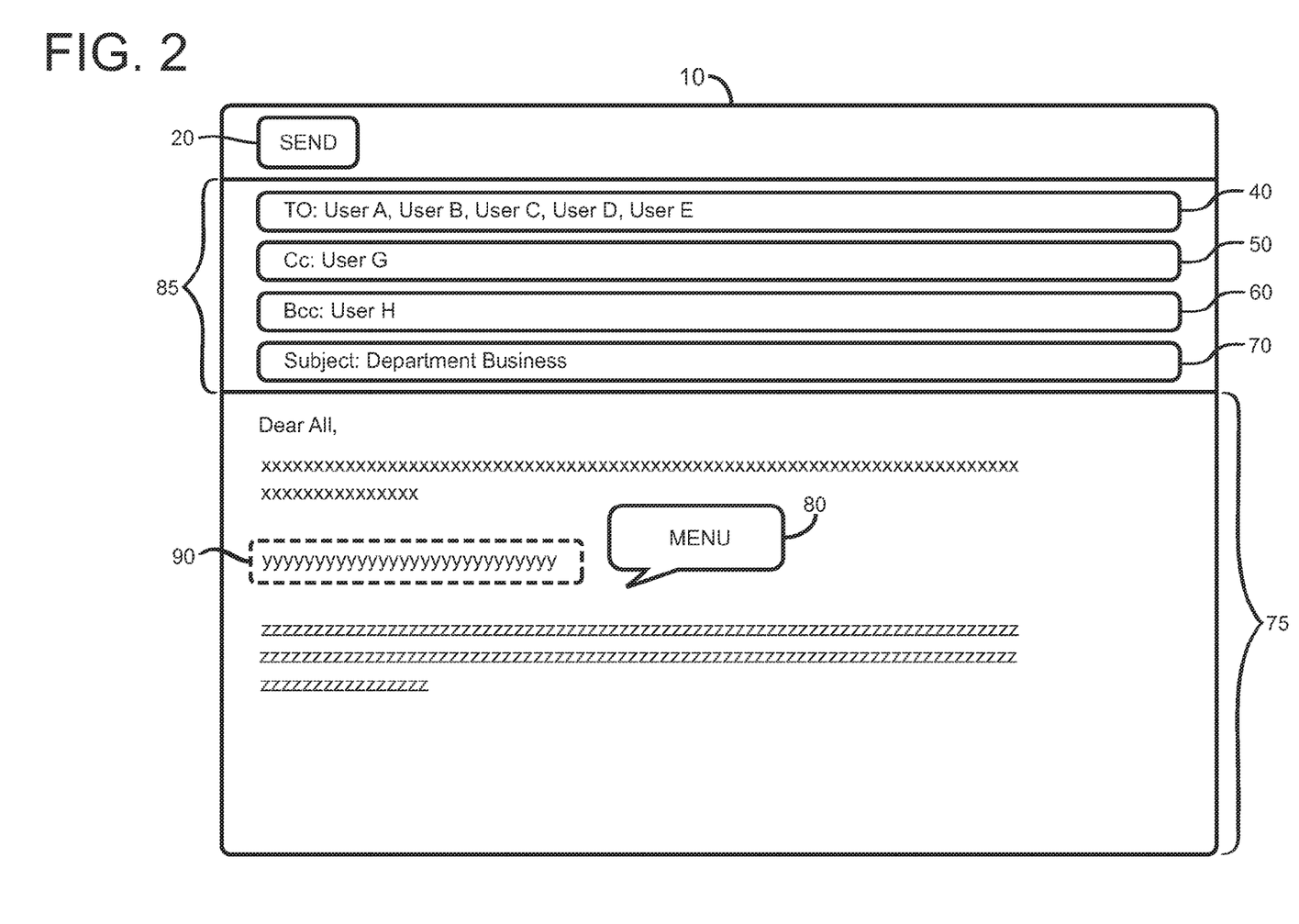
FIG. 2 is another screen shot the disclosed email client.
Figure 4:
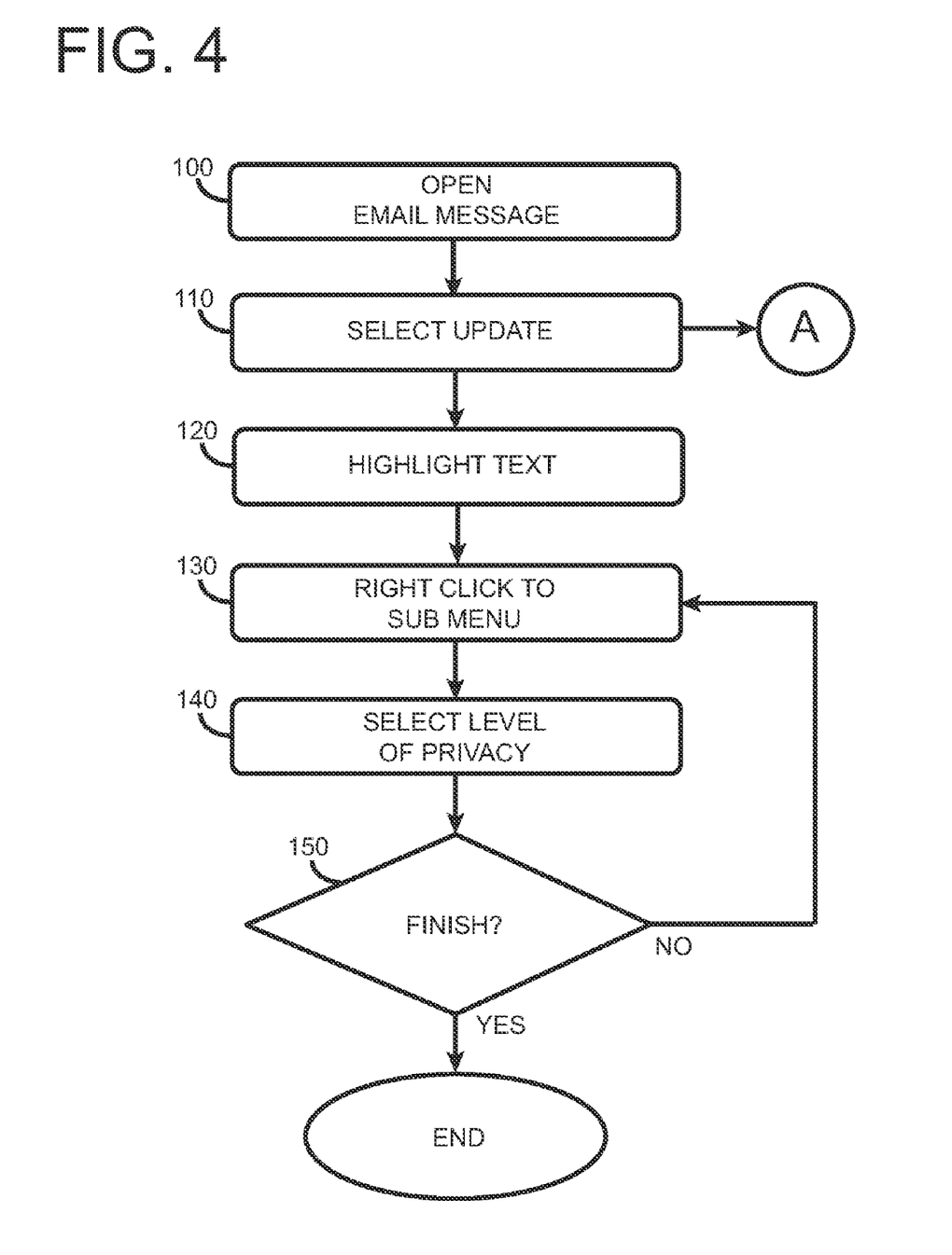
FIG. 4 illustrates the processing of a preferred embodiment of the present invention from the perspective of the user at a sending email client.
Figure 5:
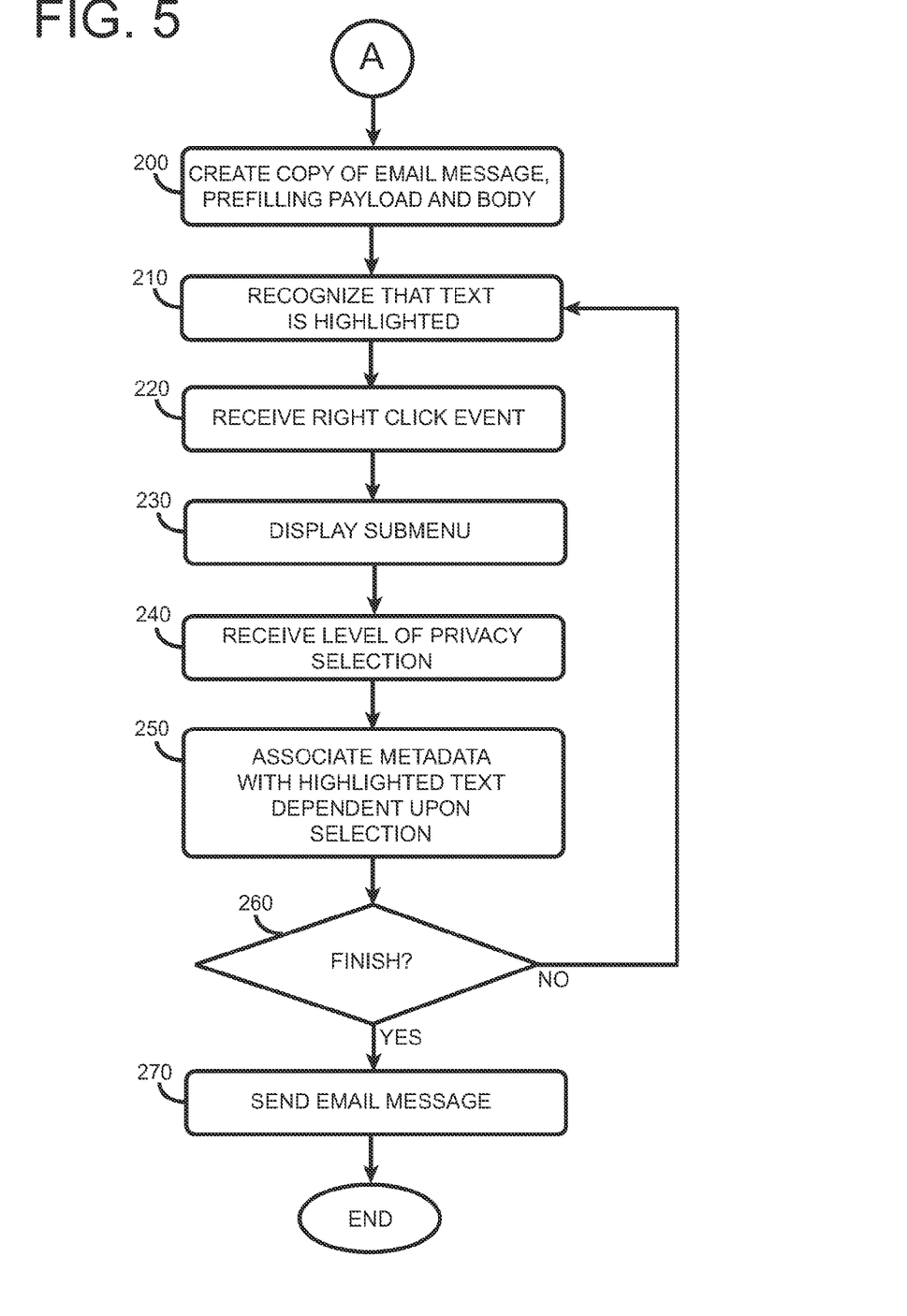
FIG. 5-7 illustrate process flow in one embodiment of the disclosed email client.

As shown in FIG. 4, such a previously sent email message may be opened (step 100) and the update button 30 selected (step 110). FIG. 4 shows the processing from the user's perspective. FIG. 5, on the other hand, illustrates processing from the system's perspective. When the update button 30 is selected, the system goes into "edit mode". This involves the system creating (step 200) a copy of the email message (including all the header and body information found in the original email message). More particularly, at step 120 of FIG. 4, the user selects some text with which to associate security (privacy) information. This is achieved by the user highlighting the text using standard mechanisms. As apparent from FIG. 2, the example shows text 90 as having been selected by the user of the sending email client. The system then recognizes that the text has been highlighted (step 210) and when the user right clicks (step 130) the system receives the right click event (step 220) and displays a sub menu (step 230). The user can use the sub menu to select an appropriate level of privacy for the highlighted text (step 140).

Figure 3:
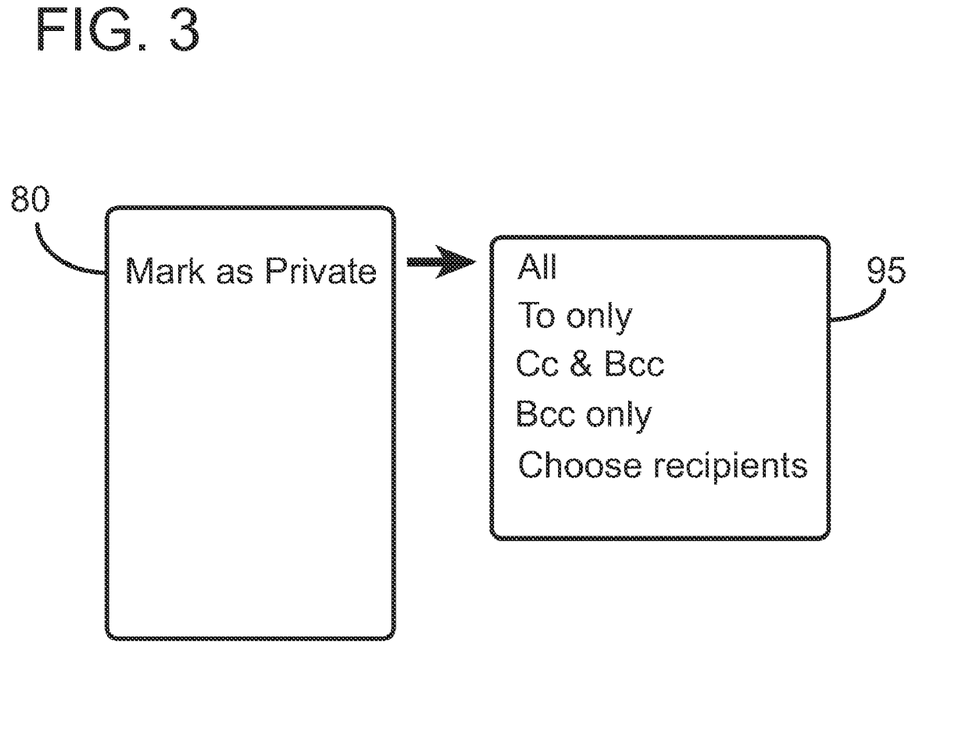
FIG. 3 illustrates an exemplary menu system of the disclosed email client.
Figure 6:
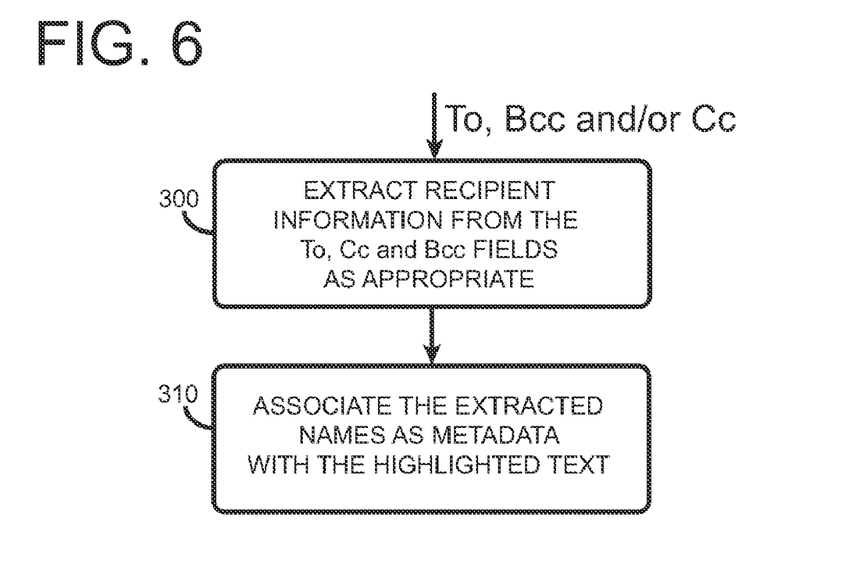

FIG. 3 provides an exemplary screenshot of the sub menu. The sub menu provides, among other things, the option to mark the text as private. This then expands to another sub menu 95 which gives certain privacy options:

All—Block this text from all recipients;
"To" only—Viewable by "To" recipients only;
"Cc & Bcc"—Viewable by "Cc" & "Bcc" recipients only;
"Cc" only—Viewable by "Cc" recipients only;
"Bcc" only—Viewable by "Bcc" recipients only; and
Choose recipients—Select who should be able to view this text Depending on the option selected at step 140, appropriate metadata is associated with the highlighted text (step 250). This is illustrated in more detail in FIGS. 6 and 7. FIG. 6 indicates what happens when one of the To, Bcc and/or Cc option is selected. At step 300, recipient information from the To, Cc and Bcc fields as appropriate is extracted. The extracted names are then associated with the highlighted text as metadata.

Figure 7:
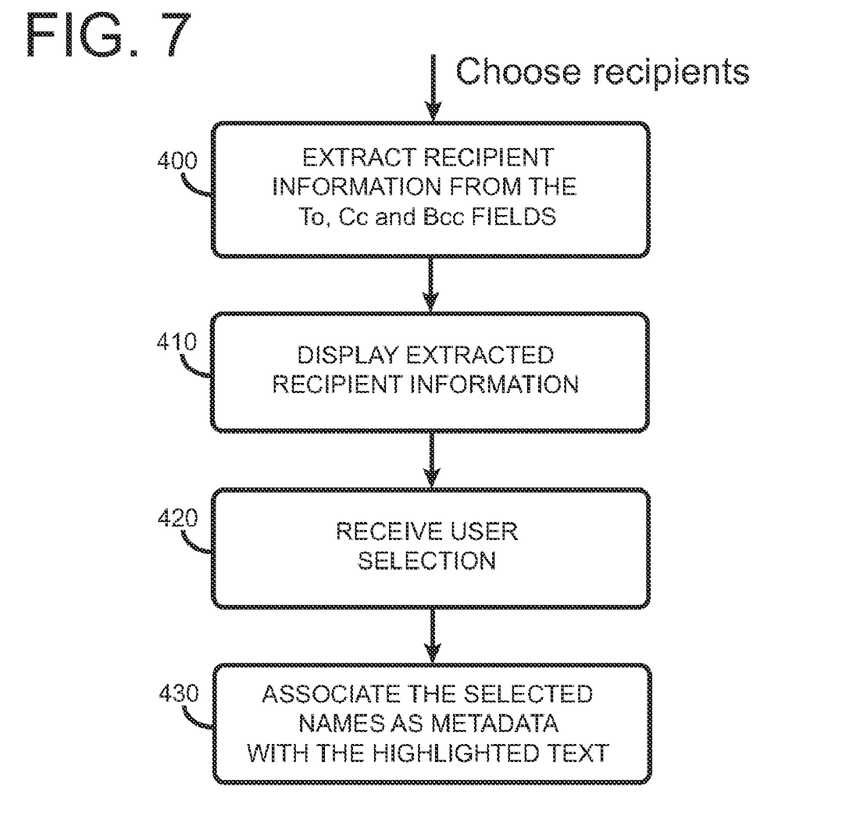

FIG. 7 shows what happens if the user indicates that the user desires to choose specific recipients from which to block selected text. At step 400, the recipient information is extracted from the To, Cc and Bcc fields. The extracted information is displayed to the user (step 410) and the user's selection is then received (step 420). The selected names are associated with the highlighted text as metadata at step 430. Although not shown, if "All" is selected, then metadata is associated with the text in question to indicate that this text should not be viewable by anyone. It is then determined by the system at step 260 of FIG. 5 whether a "send" event has been received to indicate that the user has finished updating the email message with privacy information. This is initiated by the user selecting the send button 20 of FIG. 2, at which point processing ends in FIG. 5. Otherwise processing loops back (step 150, 260) until the user highlights more text (120, 210). Thus, when the user indicates that they have finished updating the email message, the send event causes the mail to be sent to the recipients listed in the email message header (step 270).

As discussed above, email messages are typically encoded in MIME format. Email messages may include multiple sections holding different information. For example, an email message may contain a section that is simply plain text, which can be understood by legacy systems. There may also be an html section that contains the same information but also includes formatting information for use by more advanced email clients. Other sections of varying degrees of complexity are also possible in an email message.

Thus, a preferred embodiment of the disclosed methodology envisions one MIME section including security (privacy) metadata marked-up version of the text. The association of security metadata with different paragraphs of the email message may equate to tags denoting the start and the end of a particular piece of text. It will of course be appreciated that the present invention is not limited to a system which can associate privacy metadata with paragraphs only. Sentences or even individual words can have privacy metadata associated with them.

Figure 8:
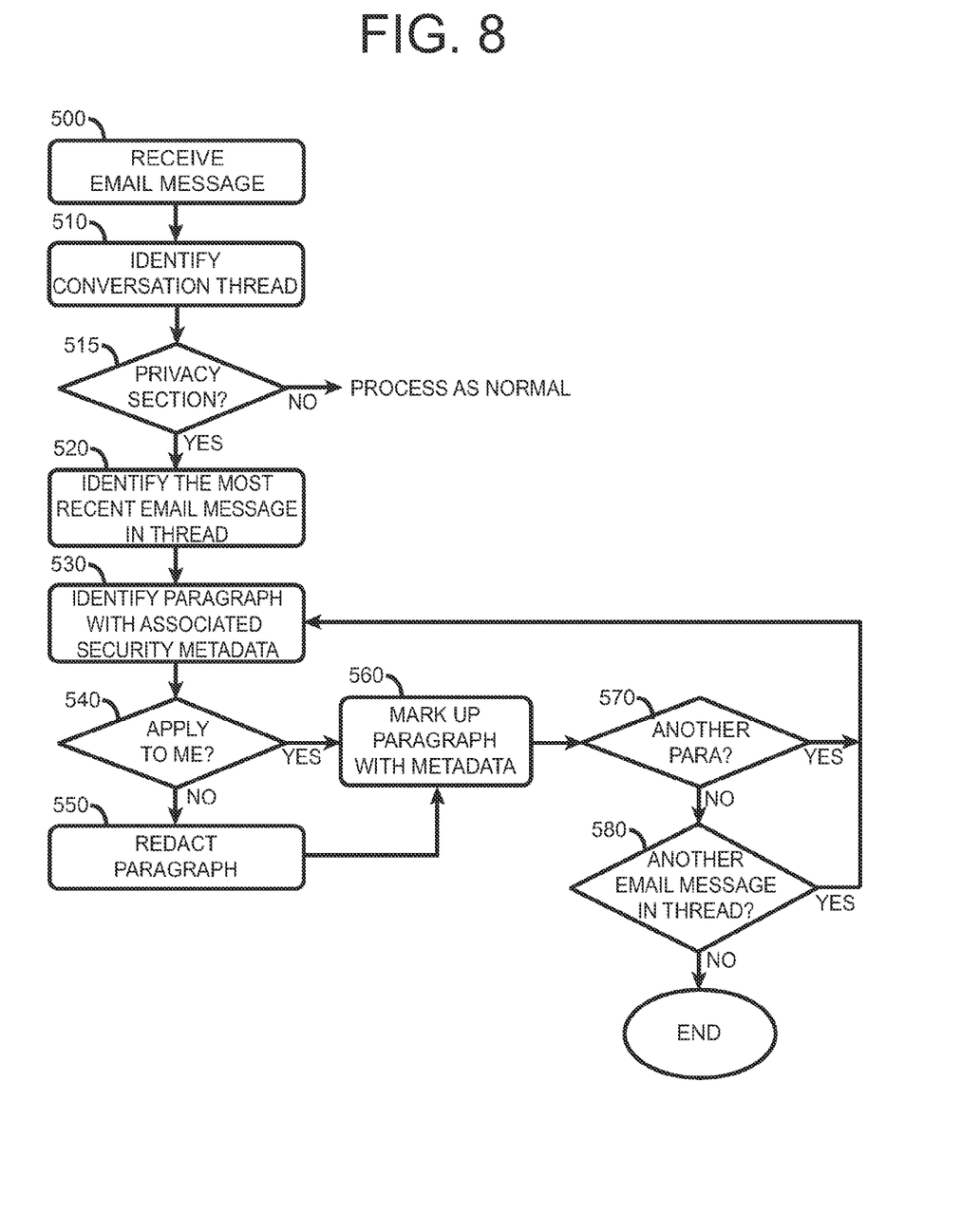
FIG. 8 shows process flow in a receiving email client.

FIG. 8 illustrates the processing that occurs when an email message is received at step 500 and that email message includes privacy metadata. First of all, a conversation thread is identified at step 510. This is achieved using standard mechanisms and so will not be discussed in any more detail here. At step 515, the receiving email client determines whether the newly received email message includes a privacy section. If the answer is no, then the received email message is processed as normal. If the answer is yes, namely the received email message does include a privacy section, then the most recent email message (X) in the conversation thread is identified (step 520). The system parses through the email message X comparing the text in the email message's body to the privacy section in the newly received email message (R). At step 530, a paragraph having associated privacy metadata is identified in email message R. The privacy metadata is inspected at step 540 to determine whether the particular receiving client is included in the privacy metadata. If the answer is no, and the particular receiving client is not included, then the paragraph is redacted. This could involve removing or replacing the paragraph from email message X at step 550. Processing then continues to step 560. If the answer is yes, then the paragraph is marked with the privacy metadata contained in the privacy section of email message R (step 560).

Note, if step 560 is reached from step 550, then this paragraph could have been removed and replaced with privacy metadata. This may include the originally received privacy metadata and/or may include other identifying information, for example, a non-reversible identifying information for the text removed (e.g. an SHA1 digest of the text, or the number of characters removed). This would mean that it would be possible to forward an email message from an unauthorized email client to an authorized client and for any text to be added back in at the authorized email client. This assumes that the authorized email client is still in possession of the original text represented by the identifying information.

To reiterate, in the case where an unauthorized email client receives an email message and then sends it on to an authorized client, the authorized client will only be able to see the "private" information if they were included in the original distribution list, or they have been sent a copy by another authorized individual. In the case where the sender knows in advance that a section is private, it is preferably never sent to any unauthorized email clients. In the case where a section is being retrospectively marked private, then the unauthorized email client will need to remove the text when it receives the update (step 550).

It will be appreciated that a "grant" model has been described—i.e. where it is possible for the receiving email client to view the paragraph, if their name is associated with the paragraph. Alternatively a "revoke" model could be applied. In a revoke model, the receiving email client is unable to view the paragraph if their name is associated with that paragraph. As an extension, wildcards may be used. For example, *.company_x.com would mean that anybody with a company_x email address would be authorized. At step 570, it is determined whether there is another paragraph in email message R that matches a paragraph in email message X which has associated privacy metadata. If the answer is yes, then processing loops back to step 530. If the answer is no, then it is determined whether there is another email message in the conversation thread identified at step 520. If there is another email message, then processing loops back to step 530. Otherwise processing ends.

As indicated above, even if a particular paragraph, word etc., is not private from the receiving recipient, an indication is left in the updated email message to indicate who is restricted from seeing that paragraph. In this way, if the receiving email user forwards the email message on (or replies to an email message including privacy data), the privacy information can be applied as appropriate at the receiving email client. Additionally, private information may be added back in when one email client receives an email but taken back out again when received by a different email client. It will be appreciated that while the disclosed methodology has been described in terms of identifying paragraphs having associated privacy metadata, the disclosed methodology is not limited to such. This has been used for exemplary purposes only and sentences or even individual words may be identified.

Moreover, the present invention has been described as using a MIME section to send privacy metadata to a compatible email receiving client. It should be appreciated that not all email clients will understand such a section. Thus, the disclosed methodology preferably also envisions a mechanism by which less advanced clients can receive an updated email message. In such an environment the sending email client has to create a new version of the email message and this then email message replaces the old email message. The sending email client associates privacy metadata with paragraphs of the email message as before. However when the user clicks the send button, the email message does not get sent immediately.

Figure 9:
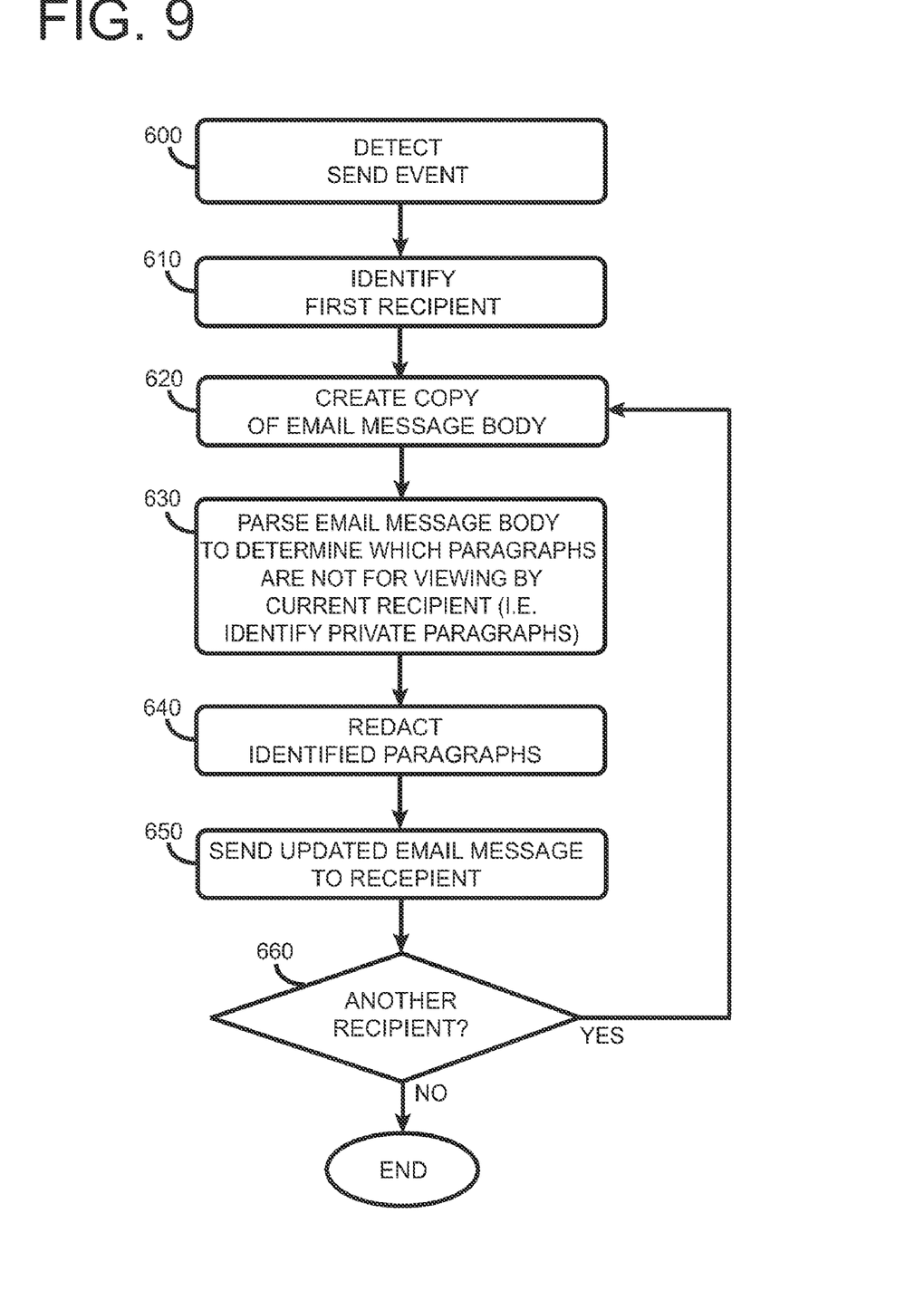
FIG. 9 shows process flow in a sending email client, wherein the receiving email client may be a legacy system. The same process may be also applicable when emails are being replied to or forwarded.

The processing that occurs is shown in FIG. 9. Such processing can occur when resending an email message (i.e. as the originator of the email message) or when forwarding or replying to an email message. A send event is detected at step 600 and this indicates that the user has finished updating the email message with privacy information. The first recipient is identified at step 610. A copy of the email message is created (step 620) and the email message is parsed to determine which paragraphs are not for viewing by the current email recipient (step 630). Identified (private) paragraphs are redacted (step 640) and the email message is then sent to the current email recipient (step 650). Processing loops back to step 620 if there is another recipient identified at step 660. Otherwise processing ends.

The sent email message may also include a MIME section having the marked-up information. This is sensible if the receiving client is authorized. Otherwise the MIME section should simply contain some non-reversible identifying information for the text removed (e.g. a SHA1 digest of the text, or the number of characters removed). This would mean that it would be possible to forward an email message from an unauthorized client to an authorized client and for any text to be added back in at the authorized client. This assumes that the authorized client is still in possession of the original text represented by the SHA1 digest. With regard to both embodiments and as described, an option may be provided to make certain sections confidential from any receiving client.

As discussed, a MIME section may be sent including marked-up privacy metadata. This could just refer to certain paragraphs (in which case it may contain the complete paragraph or identifying features of the paragraph). Another option is to include a complete version of the email message marked up. If this second option is used then it may not be necessary to create a copy of the email message at the receiving client end. Rather, the marked up email message sent may have material redacted and this version may then be the version the receiving user sees. One embodiment of the present invention provides a "delegated authority" option. This is where the originator is permitted to list the users who are allowed to make changes to the authorization list.

While the present invention has mainly been described with respect to text portions (paragraphs, sentences, words etc), it will be appreciated that the invention could equally apply to other data types (e.g. attachments). Further, while the invention has been described in terms of email messages, it will be appreciated that the invention is not limited to such and could apply to any type of message.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of communication, comprising:
   receiving, by an email client, an email message, thus providing a previously received email message;
   receiving, by the email client, an update to the previously received email message;
   identifying, by the email client, privacy information in the update that is associated with a first portion of the previously received message, the privacy information indicating whether a user is permitted to view the first portion of the previously received email message; and
   updating, by the email client, the previously received message in response to the privacy information.

2. The method of claim 1, wherein the updating step comprises replacing the previously received message with an updated version of the previously received message.

3. The method of claim 1, wherein the updating step comprises modifying the previously received message using the privacy information.

4. The method of claim 1, wherein the privacy information comprises a recipient name and the named recipient is classified as being able to view the first portion of the message associated with the privacy information.

5. The method of claim 1, wherein the privacy information comprises a recipient name and the named recipient is classified as being unable to view the first portion of the message associated with the privacy information.

6. The method of claim 1, wherein the privacy information comprises wildcard information.

7. The method of claim 1, further comprising:
redacting, by the email client, the first portion of the message, in response to responsive to determining that the user is not permitted to view that first portion of the message.

8. The method of claim 7, wherein the step of redacting comprises removing the first portion of the message.

9. The method of claim 7, wherein the step of redacting comprises replacing the first portion of the message with identifying information.

10. The method of claim 7, wherein the step of redacting comprises replacing the first portion of the message with a digest of the message.

11. The method of claim 1, further comprising:
identifying, by the email client, at least one related message that relates to the previously received email message; and
updating, by the email client, the at least one related message as directed the privacy information.

12. The method of claim 1, wherein in the receiving an update step the update includes an updated message to a recipient.

13. The method of claim 12, wherein the step of sending a message comprises:
determining, by the email client, whether the recipient is authorised to view a second portion of the message; and
redacting, by the email client, the second portion of the message in response to a determination that the recipient is not authorized to view the second portion of the message.

14. The method of claim 13, further comprising:
opening a previously sent message;
identifying a portion of the previously sent message;
associating privacy information with the portion of the previously sent message, the privacy information indicating whether a previous recipient of the previously sent message is permitted to view the second portion of the message; and
resending the previously sent message to the previous recipient of the previously sent message.

15. The method of claim 1 comprising:
generating a new message based on the privacy information, which indicates whether a previous recipient of the previously sent message is permitted to view the portion of the previously sent message, and based on the previous recipient to whom the message is to be resent.

16. The method of claim 15, wherein the step of generating a new message comprises:
identifying to whom the message is to be resent;
determining from the privacy information whether the identified recipient is permitted to view the portion of the previously sent message;
responsive to determining that the identified recipient should be unable to view the portion of the previously sent message, redacting the portion prior to resending the message.

17. A computer program product, comprising:
a non-transitory computer readable storage medium;
first program instructions that receive an email message, thus providing a previously received email message;
second program instructions that receive an update to the previously received email message;
third program instructions that that identify privacy information in the update that is associated with a first portion of the previously received message, the privacy information indicating whether a user is permitted to view the first portion of the previously received email message; and
fourth program instructions that update the previously received message in response to the privacy information,
wherein the first, second, third and fourth program instructions are stored on the computer readable storage medium.

18. The computer program product of claim 17, wherein the fourth program instructions that update the previously received message replace the previously received message with an updated version of the previously received message.

19. The computer program product of claim 17, wherein the fourth program instructions that update the previously received message modify the previously received message using the privacy information.

20. The computer program product of claim 17, wherein the privacy information comprises a recipient name and the named recipient is classified as being able to view the first portion of the message associated with the privacy information.

* * * * *